Nov. 19, 1968
HIROSHI TADO
3,411,487
SUCTION DEVICE FOR ROTARY PISTON
INTERNAL COMBUSTION ENGINE
Filed Nov. 4, 1966
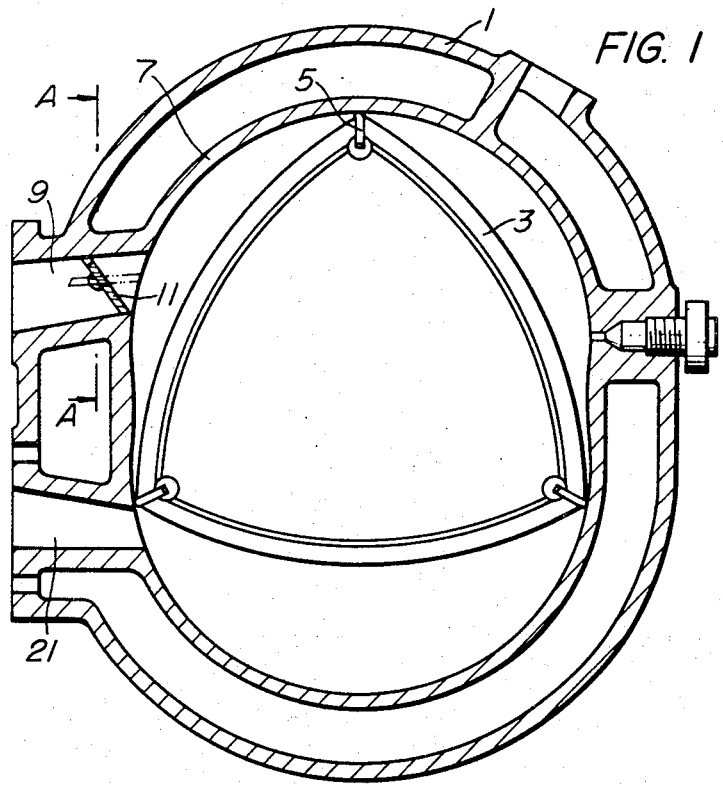
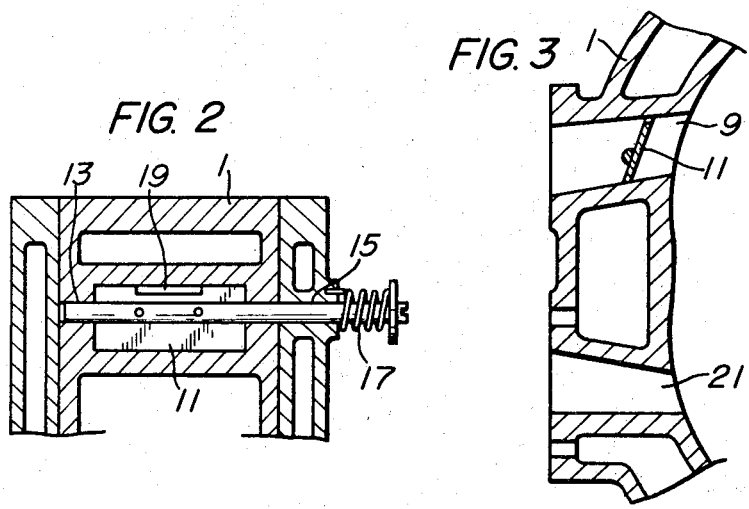

United States Patent Office 3,411,487
Patented Nov. 19, 1968

3,411,487
SUCTION DEVICE FOR ROTARY PISTON
INTERNAL COMBUSTION ENGINE
Hiroshi Tado, Suita-shi, Japan, assignor to Yanmar Diesel
Engine Co., Ltd., Osaka, Japan, a corporation of Japan
Filed Nov. 4, 1966, Ser. No. 592,066
Claims priority, application Japan, Feb. 14, 1966,
41/12,241
2 Claims. (Cl. 123—8)

ABSTRACT OF THE DISCLOSURE

An automatic suction control valve for preventing blow-back in rotary piston internal combustion engines operating at low speeds comprising a spring biased, rotary valve member mounted in the intake port closely adjacent the inner peripheral surface of the engine. The dynamic pressure of intake gases overcomes the spring force to open the valve an amount corresponding to engine speed. The valve is automatically closed by blow-back of exhaust gases. The valve also includes a notched portion allowing sufficient intake for no load operation.

This invention relates to suction devices for rotary piston internal combustion engines and more particularly for those of the type including sealing elements attached to the respective apex portions of the piston and adapted to open and close the intake and exhaust ports formed in the periphery of the housing body to control gas exchange of the engine. The present invention has for its object to prevent the so-called blow-back phenomenon during engine operation at slow speeds. Thereby to increase the stability of such slow-speed operation.

Previously, with rotary piston internal combustion engines of the type described, the intake and exhaust ports have had a substantial cross-sectional area, giving a considerable length of overlapping period, and thus caused an undesirably large blow-back of exhaust gases into the intake conduit particularly during slow-speed operation of the engine.

With the intention of overcoming such difficulty, the present invention proposes to provide an automatic control valve in the intake port closely to the slide surface of the housing body the opening of which valve is determined by the velocity of gases flowing through the intake port and which is operable to automatically close the intake passage whenever the blow-back pressure of the exhaust gases exceeds the intake pressure.

The above and other objects, features and advantages of the present invention will become apparent from the following description when taken in conjunction with the accompanying drawings in which:

FIG. 1 is a transverse cross-sectional view of a suction device embodying the present invention:

FIG. 2 is a cross-sectional view substantially taken along the line A—A in FIG. 1; and FIG. 3 illustrates another embodiment of the invention.

Referring to FIGS. 1 and 2, reference numeral 1 indicates the housing body of a rotary piston internal combustion engine, 3 its piston and 5 sealing elements mounted on the apex portions of the piston. The housing body 1 is formed with an intake port 9 in which an automatic control valve 11 is arranged closely to the slide surface 7 of the housing. The control valve 11 includes a shaft and a valve plate mounted on the shaft eccentrically thereof. The valve shaft is journaled at opposite ends as indicated at 13 and 15 in FIG. 2 and undergoes an unbalanced turning moment under the dynamic pressure of the gaseous mixture entering the intake port 9 because of the off-center mounting of the valve plate on the shaft. The unbalanced turning moment is counterbalanced by a preloaded torsion spring 17 arranged on the valve shaft and anchored to a fixed part, as illustrated. For the starting operation, the control valve 11 is slightly notched or slotted as at 19 on its side remote from the inlet opening of the intake port 9 to allow passage of an amount of intake mixture necessary for no-load operation of the engine even with the control valve held in its fully closed position. In other words, during slow-speed operation engine, the intake port is in a throttled state and the overlapping area of the intake and exhaust ports is limited compared to that during operation at higher speeds. This apparently results in a reduced blow-back and the blow-back, if any, is further limited by the fact that the back pressure acting on the control valve tends to close the latter because of its mounting structure described above.

In FIGS. 1 and 3, reference numeral 21 indicates an exhaust port formed in the housing body.

FIG. 3 illustrates another arrangement of automatic control valve, and no further description will be made herein on such valve arrangement as it functions in quite the same manner as the one shown in FIGS. 1 and 2.

It will be recognized from the foregoing that the section device according to the present invention is effective to improve the slow-speed performances of a rotary piston internal combustion engine without any sacrifice of its high-speed performances.

What is claimed is:

1. In a rotary piston internal combustion engine including a housing having a chamber therein, a piston rotatably mounted in the chamber adapted to open and close intake and exhaust ports in the periphery of the chamber to control gas exchange in the engine, an automatic suction control valve for preventing blow-back at low engine speeds comprising a valve member rockably mounted in the intake port closely adjacent the periphery of the chamber, spring means biasing said valve member towards a closed position, the dynamic pressure of intake gases overcoming said spring biasing means to rock open said valve an amount corresponding to the pressure applied thereto, said valve closing upon blow-back of exhaust gases.

2. An automatic suction control valve according to claim 1 further comprising a notch formed in a portion of said valve, said notch being of sufficient dimensions to allow passage of an amount of intake gases necessary for no-load operation.

References Cited

UNITED STATES PATENTS 2,136,636  11/1938  Rotter _____ 103—195
2,661,145  12/1953  Heineman _____ 230—22
3,168,077   2/1965  Froede.

FOREIGN PATENTS 993,769  6/1965  Great Britain.

FRED C. MATTERN, Jr., *Primary Examiner.*

W. J. GOODLIN, *Assistant Examiner.*